June 7, 1938. L. A. SUEKOFF 2,119,758
SEAT CONSTRUCTION FOR MOTOR VEHICLES AND THE LIKE
Filed Feb. 28, 1935 2 Sheets-Sheet 1
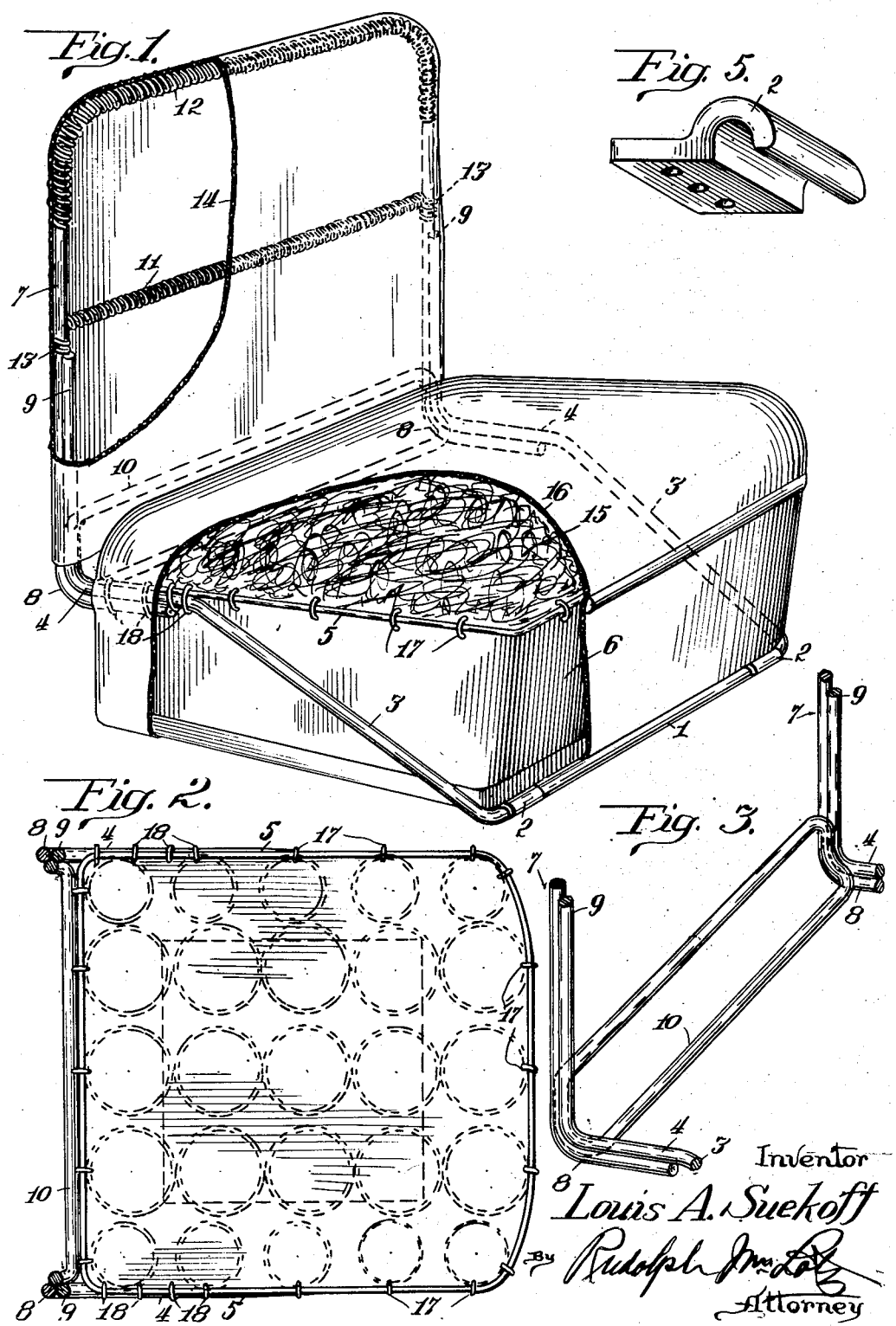

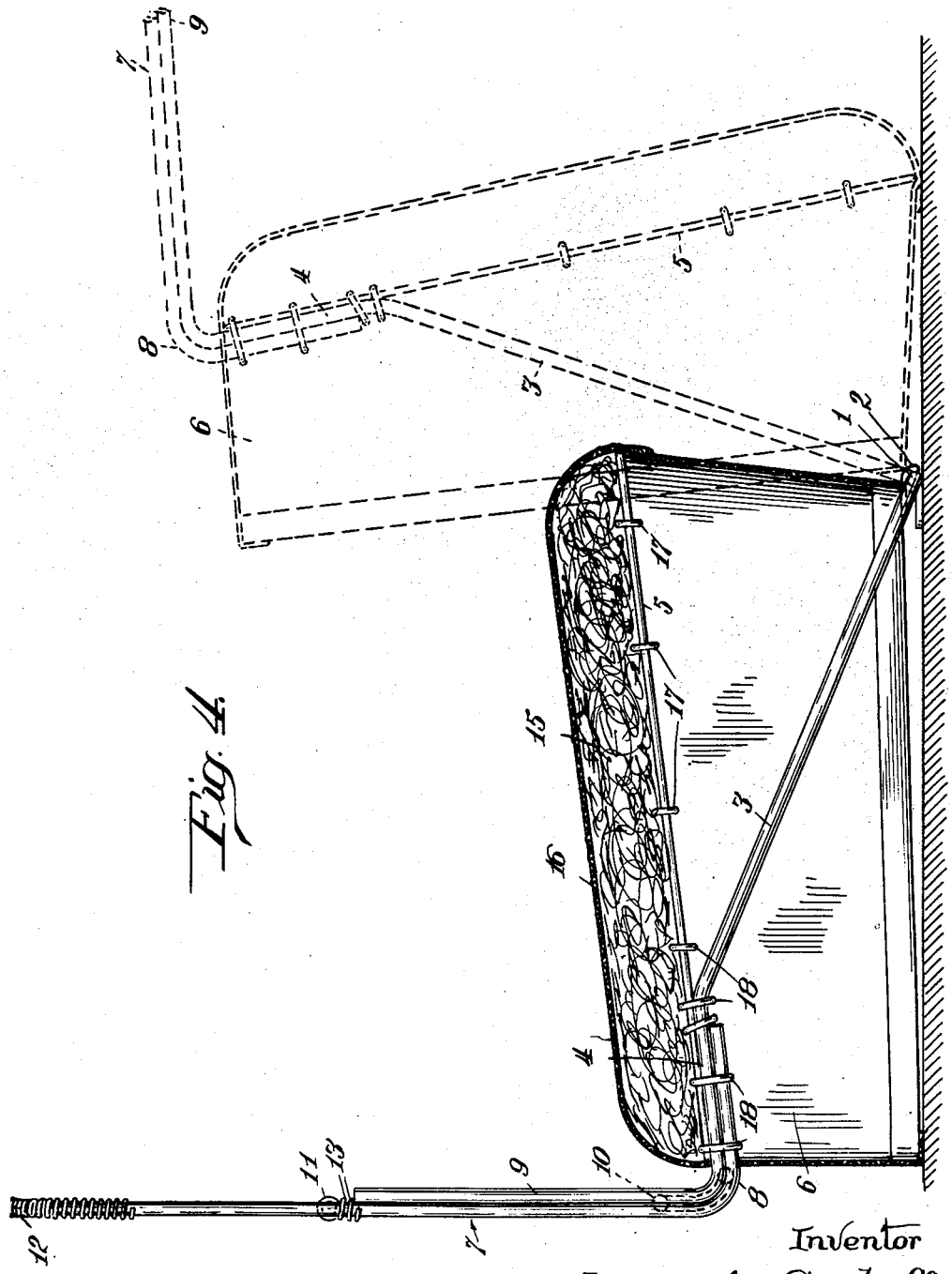

Patented June 7, 1938

2,119,758

UNITED STATES PATENT OFFICE 2,119,758

SEAT CONSTRUCTION FOR MOTOR VEHICLES AND THE LIKE

Louis A. Suekoff, Wilmette, Ill.; Pauline G. Suekoff, administratrix of said Louis A. Suekoff, deceased, assignor to Nachman Spring-Filled Corporation, Chicago, Ill., a corporation of Illinois Application February 28, 1935, Serial No. 8,678

7 Claims. (Cl. 155—5)

The invention relates particularly to improvements in the type of seat which is used in automotive vehicles equipped with only front doors and having a rear seat which is accessible by swinging a front seat pivotally to tilt it forward to provide a passage for entrance to the rear end portion of the car body, it being obvious, of course, that said seat may be used otherwise without departing from the invention.

The main object of the invention is to provide a cheap, light and comfortable seat construction adapted for use as above indicated and wherein the seat back will fall and rise in unison with the compression of the seat cushion in response to the imposition of weight upon the latter and also responsively to the jolting of the vehicle in travel.

A further object of the invention is to provide a seat construction of the type specified wherein the back frame of the structure yields readily to the pressure against the same by the person seated on the seat cushion of the structure and provide ample comfort without necessitating the use of a conventional type of upholstery to constitute a part of said seat, more commonly known as a chair back.

Other objects of the invention will be pointed out or understood from the following specification.

A suitable embodiment of the invention is illustrated in the accompanying drawings, wherein:

Fig. 1 is a perspective view, partly in section, illustrating a seat construction constructed in accordance with the invention.

Fig. 2 is a plan section of the same taken on the horizontal plane immediately above the level of the seat cushion of the structure.

Fig. 3 is a perspective sectional view showing a portion of the metal frame of the seat construction.

Fig. 4 is a side elevation of the structure, the cover fabric of the seat cushion being shown in section to expose to view the side rails of the base portion of the seat frame and wherein the structure is shown in dotted lines in its tilted position.

Fig. 5 is a perspective view of one of the pivot blocks with which the frame of the seat construction is connected.

The structure of this invention comprises a wire frame consisting of a base portion having a front rail (1) adapted to rest upon the floor of the vehicle and which is pivotally secured to the latter by means of two or more of the pivot blocks (2) shown in Fig. 5 which are of well known conventional type. Integral with the said front rail (1) are parallel side rails (3) which extend upwardly at an incline from the front rail and terminate at their rear ends in substantially horizontal portions (4) which are secured to the top border wire frame (5) of the seat cushion (6). The latter normally rests upon the floor of the vehicle and affords a yielding support for the said side rails (3) and also for the chair back (7).

The chair back includes a pair of L-shaped side rails (8), the lower arms of which are welded to the horizontal portions of the side rails (3) of the base frame. The said portions (4) of the side rails terminate in upwardly extending arms (9) which are welded to the side rails (8) of the chair back (7). As shown in Fig. 3, the elbow portions formed by the elements (4), (8) and (9) are jointed by means of a substantially rectangular wire frame (10), the end rails of which are bent to arcuate form and are welded to the said elbow portions of the members (4), (8) and (9).

Preferably, the side rails of the chair back (7) are yieldingly connected with each other by means of a plurality of sufficiently strong helical springs (11) and (12), respectively, to provide yielding members against which the pressure of the back of the occupant of the seat is exerted and which, obviously, will conform themselves substantially to the lateral contour of the surface bearing against said springs to afford a very comfortable support. It will be noted that the upper spring (12) has its end portions telescopically engaged with the upper end portions of the side rails of the chair back and presents arcuate corners or end portions joining said telescopically engaged end portions and the main or middle portion of the spring.

The spring (11) terminates in several loops (13) which are telescopically engaged with the side rails of the chair back and rest upon the terminal end portions (9) of the side rails (3—4). The said loop formations (13) form distortions of the extremities of the springs (11).

It will be obvious, of course, that several springs similar to the spring (11) may be employed, if desired.

Preferably, a flat bag (14) receives the entire chair back and cooperates with the side rails of the latter and said springs (11) and (12) to provide a very comfortable form-fitting chair back structure. Said bag (14) may include a padded front wall if desired.

The seat cushion is preferably of the type made up of a suitable spring assembly of adequate depth to adapt it to the purposes of the invention and would include, obviously, a substantial base-structure of any of the conventional types commonly used for the purpose and which, along its front rail, will rest upon the pivot member (2) or which may, if desired be secured to the front rail (1) of the chair frame. Said spring assembly supports the usual and customary pad (15) of hair or other fibrous material, the said spring assembly and said pad being housed in a cover fabric (16) which encloses substantially the entire spring assembly and is disposed to also enclose the side rails (3—4) and the lower arms of the side rails (8) of the chair back.

As shown, the border wire frame (5) of the spring assembly is suitably secured to the said portions (4) and (8) of the side rails (3) of the frame structure and the portions (8) of the side rail of the chair back, so that, as said border wire moves up and down responsively to the variations of load on the seat cushion, the frame structure will rock on the axis of the front rail (1) thereof and thus all friction between the bag (14) and the clothing of the occupant of the seat cushion is eliminated.

When the seat is tilted to the position shown in dotted lines in Fig. 4, the rear end portion of the seat cushion is suspended from the frame structure.

Obviously, the border frame (5) of the seat cushion is firmly secured to the upper end coils of the springs of the spring assembly as by means of the hog-nose rings (17), rings (18) of that type, being also adapted to secure the said frame (5) to the side rails portions (4) of the chair frame.

The entire structure is also advantageous in that the frame structure is sufficiently elastic to yield to the extent necessary to provide complete comfort, it being also very light, durable and inexpensive.

I claim as my invention:

1. A tiltable seat structure comprising a floor supported spring-filled seat cushion equipped with a relatively rigid marginal frame secured to the upper-most portions of the marginal springs of said cushion, a pair of side arms pivotally secured at their lower forward ends to the floor on an axis substantially coincident with the lower front corner of the cushion and secured between their ends to the rear corners of said marginal frame, said arms terminating in substantially upright arms constituting the side rails of a back structure, and a yielding member secured to said side rails to form a back-rest for said cushion, said arms being adapted to move pivotally responsively to loads on said cushion and to be tilted forwardly to similarly tilt said cushion.

2. A tiltable seat structure comprising a substantially U-shaped metal frame having its middle portion supported upon and pivotally secured to a supporting surface, a seat cushion disposed between the arms of said frame and having its front lower corner disposed contiguous to said middle portion of said frame, said seat cushion being supported upon said surface and being equipped at its upper end with a marginal metal frame presenting side rails secured along their rear end portions to the arms of said U-shaped frame.

3. A tiltable seat structure comprising a substantially U-shaped metal frame having its middle portion supported upon and pivotally secured to a supporting surface, a seat cushion disposed between the arms of said frame and having its front lower corner disposed contiguous to said middle portion of said frame, said seat cushion being supported upon said surface and being equipped at its upper end with a marginal metal frame presenting side rails secured along their rear end portions to the arms of said U-shaped frame, said arms of said last-named frame equipped with upwardly projecting portions constituting side rails of a chair back.

4. A tiltable seat structure comprising a substantially U-shaped metal frame having its middle portion supported upon and pivotally secured to a supporting surface, a seat cushion disposed between the arms of said frame and having its front lower corner disposed contiguous to said middle portion of said frame, said seat cushion being supported upon said surface and being equipped at its upper end with a marginal metal frame presenting side rails secured along their rear end portions to the arms of said U-shaped frame, said arms of said last-named frame equipped with upwardly projecting portions constituting side rails of a chair back and yielding cross-members connected at their ends with said last-named side rails.

5. A tiltable seat structure comprising a floor supported seat cushion consisting of a conventional spring assembly equipped with a seat pad and cover fabric, and including an upper marginal metal frame supported by the springs of said spring assembly, a metal frame comprising a front rail pivotally secured to the floor contiguously to the front lower corner of said seat cushion, side rails extending from the ends of the front rail along the side walls of the seat cushion at an upward incline and secured along their rear end portions to the rear end portion of the said marginal frame of the seat cushion, and a seat back supported by the rear end portions of said side rails, said seat cushion being carried by said side rails when said frame structure is swung forward.

6. A tiltable seat structure comprising a floor supported seat cushion consisting of a conventional spring assembly equipped with a seat pad and cover fabric, and including an upper marginal metal frame supported by the springs of said spring assembly, a metal frame comprising a front rail pivotally secured to the floor contiguously to the front lower corner of said seat cushion, side rails extending from the ends of the front rail along the side walls of the seat cushion at an upward incline and secured along their rear end portions to the rear end portion of the said marginal frame of the seat cushion, and a seat back supported by the rear end portions of said side rails, said seat cushion being carried by said side rails when said frame structure is swung forward, and a rigid cross-bar connecting the rear end portions of said side rails with each other, the latter terminating in upwardly extending arms constituting side rails of the chair back.

7. A tiltable seat structure comprising a floor supported spring-filled seat cushion equipped with a relatively rigid marginal frame secured to the upper-most portions of the marginal springs of said cushion, a U-shaped metal frame pivotally secured along its middle portion directly to the floor along the lower front corner of said cushion, the arms of said last-named frame extending along the sides of said cushion to its upper rear corner and being then secured to the rear corners of said marginal frame, the outer ends of the arms of said U-shaped frame extending substantially vertically from the rear corners of said marginal frame and constituting the side rails of a back supporting structure and a back rest carried by said side rails, said arms being adapted to move pivotally responsively to loads on said cushion and to be tilted forwardly to similarly tilt said cushion.

LOUIS A. SUEKOFF.